(12) United States Patent (10) Patent No.: US 7,921,148 B2
Kuenemund (45) Date of Patent: Apr. 5, 2011

(54) STANDARD CELL FOR ARITHMETIC LOGIC UNIT AND CHIP CARD CONTROLLER

(75) Inventor: Thomas Kuenemund, Munich (DE)

(73) Assignee: Infineon Technologies AG, Neubiberg (DE)

( * ) Notice: Subject to any disclaimer, the term of this patent is extended or adjusted under 35 U.S.C. 154(b) by 1272 days.

(21) Appl. No.: 11/501,305

(22) Filed: Aug. 9, 2006

(65) Prior Publication Data

US 2008/0126456 A1 May 29, 2008

(51) Int. Cl.
*G06F 7/38* (2006.01)

(52) U.S. Cl. ........ 708/490; 708/230; 708/231; 708/232; 708/236

(58) Field of Classification Search .................. None
See application file for complete search history.

(56) References Cited

U.S. PATENT DOCUMENTS

| | | | | |
|---|---|---|---|---|
| 4,893,267 A * | 1/1990 | Alsup et al. | ............ | 708/518 |
| 5,555,428 A * | 9/1996 | Radigan et al. | ............ | 712/22 |
| 6,295,606 B1 * | 9/2001 | Messerges et al. | ............ | 713/189 |
| 6,476,634 B1 * | 11/2002 | Bilski | ............ | 326/40 |
| 6,973,551 B1 * | 12/2005 | Walton | ............ | 711/155 |
| 6,995,555 B2 | 2/2006 | Graf | ............ | 324/126 |
| 7,034,559 B2 | 4/2006 | Frankowsky et al. | ............ | 324/763 |
| 2002/0103839 A1 * | 8/2002 | Ozawa | ............ | 708/490 |
| 2005/0036618 A1 * | 2/2005 | Gammel et al. | ............ | 380/255 |

FOREIGN PATENT DOCUMENTS

| DE | EP 1 008 033 B1 | 6/2000 |
|---|---|---|
| DE | 102 01 449 | 8/2003 |

OTHER PUBLICATIONS

Author: August; Title: "Lecture 8: Control"; Date: 2004/Fall; URL: http://www.cs.princeton.edu/courses/archive/fall04/cos471/lectures/08-Control.pdf.*

* cited by examiner

*Primary Examiner* — Lewis A Bullock, Jr.
*Assistant Examiner* — Michael Yaary
(74) *Attorney, Agent, or Firm* — Infineon Technologies Patent Department

(57) ABSTRACT

A cell for an arithmetic logic unit includes a first input; a second input; a carry-in input; a first control input and a second control input; and a circuit connected to the first input, the second input, the carry-in input, the first control input, and the second control input. The circuit has a first output and a second output, the second output having a first value as a function of the first input and the second input when the first control input and the second control input are supplied values equal to a value at the carry-in input, and having a second value as a function of the first input and second input when the values at the first control input and the second control input are independent of the value at the carry-in input.

15 Claims, 6 Drawing Sheets

| $m3$ | $m2$ | $m1$ | $ci'_p$ | $ci*_p$ | $xe1$ | $xe0$ | Operation | $s*\_n$ |
|---|---|---|---|---|---|---|---|---|
| 1 | 0 | 1 | $co_{p-1} \oplus k_{p-1}$ | $co_{p-1} \oplus k_p$ | $ci*_p$ | $ci*_p$ | ADD | $\overline{a* \oplus b* \oplus ci*}$ |
| 1 | 1 | 0 | 1 | $k_p$ | $ci*_p$ | $ci*_p$ | XOR | $\overline{(a \oplus b)*}$ |
| 1 | 0 | 0 | 1 | $\overline{k_p}$ | $ci*_p$ | $ci*_p$ | XNOR | $(a \oplus b)*$ |
| 0 | 1 | 0 | 1 | $k_p$ | 1 | 0 | NAND | $(a \cdot b)*$ |
| 0 | 0 | 0 | 1 | $\overline{k_p}$ | 1 | 0 | NOR | $(a + b)*$ |

STANDARD CELL FOR ARITHMETIC LOGIC UNIT AND CHIP CARD CONTROLLER

BACKGROUND INFORMATION

The present invention relates generally to processors and controllers and standard cells for arithmetic logic units (ALUs) in such processors and controllers.

A standard cell for ALUs in microcontrollers may be implemented using a semi-custom design style. Chip card controllers have to meet high requirements in terms of resistance to invasive probing and/or non-invasive differential power analysis (DPA) of security-critical information. One prior art device uses bitwise XOR masking of all data using time-variant masks, so-called "one-time pad (OTP)" masks.

FIG. 1 shows a so-called "mirror adder", a conventional full adder cell 10 which implements the equations $$co\_n = \overline{a \cdot b + b \cdot ci + ci \cdot a} \quad (1)$$

$$s\_n = \overline{a \oplus b \oplus ci} \quad (2).$$

The mirror adder thus logically combines the two operand bits a and b and the carry-in bit ci in order to obtain the inverted carry-out bit co_n and the inverted sum bit s_n. In a standard-cell implementation of the mirror adder, co_n and s_n are usually additionally inverted by two inverters so that then the outputs of the mirror adder cell are usually the carry bit co and the sum bit s.

When output signals produced by a conventional full adder are supplied with masked input data, the equations $$y = a \cdot b + b \cdot c + c \cdot a \quad (3)$$

$$z = a \oplus b \oplus c \quad (4)$$

are transformed under the "masking operation", that is, the XOR combination $$\hat{x} = x \oplus k \quad (5)$$

of x=a, b and c with an OTP bit k.

One then obtains $\hat{a} \cdot \hat{b} + \hat{b} \cdot \hat{c} + \hat{c} \cdot \hat{a} = (a \cdot b + b \cdot c + c \cdot a) \oplus k = y \oplus k = \hat{y}$ and $\hat{a} \oplus \hat{b} \oplus \hat{c} = a \oplus b \oplus c \oplus k = z \oplus k = \hat{z}$. The "full adder equations" are form-invariant (covariant) under the "masking operation": from input data masked with k, the full adder computes output data which is also obtained when output data from unmasked input data is masked with k.

Figure 2:
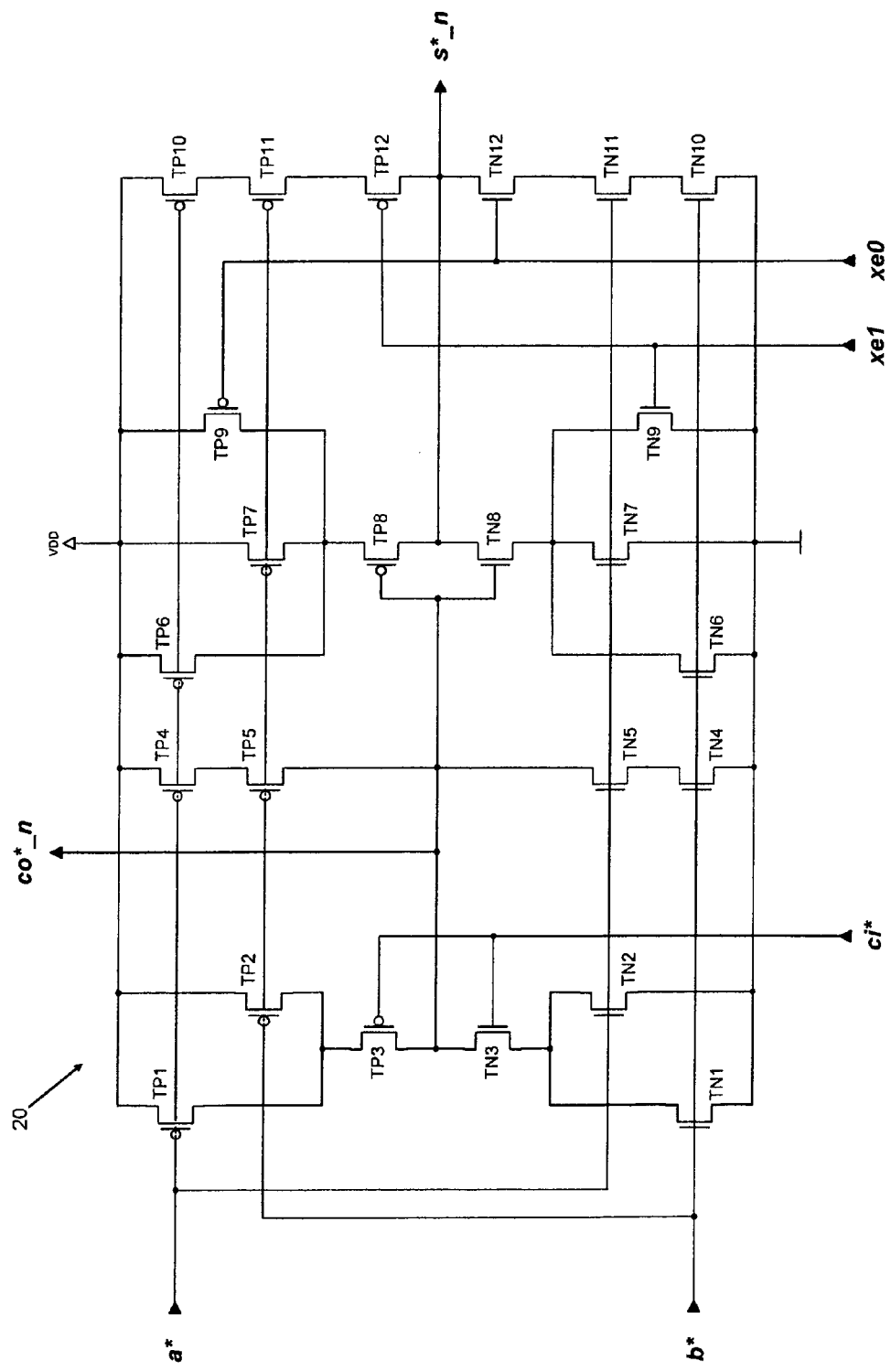
Figure 3:
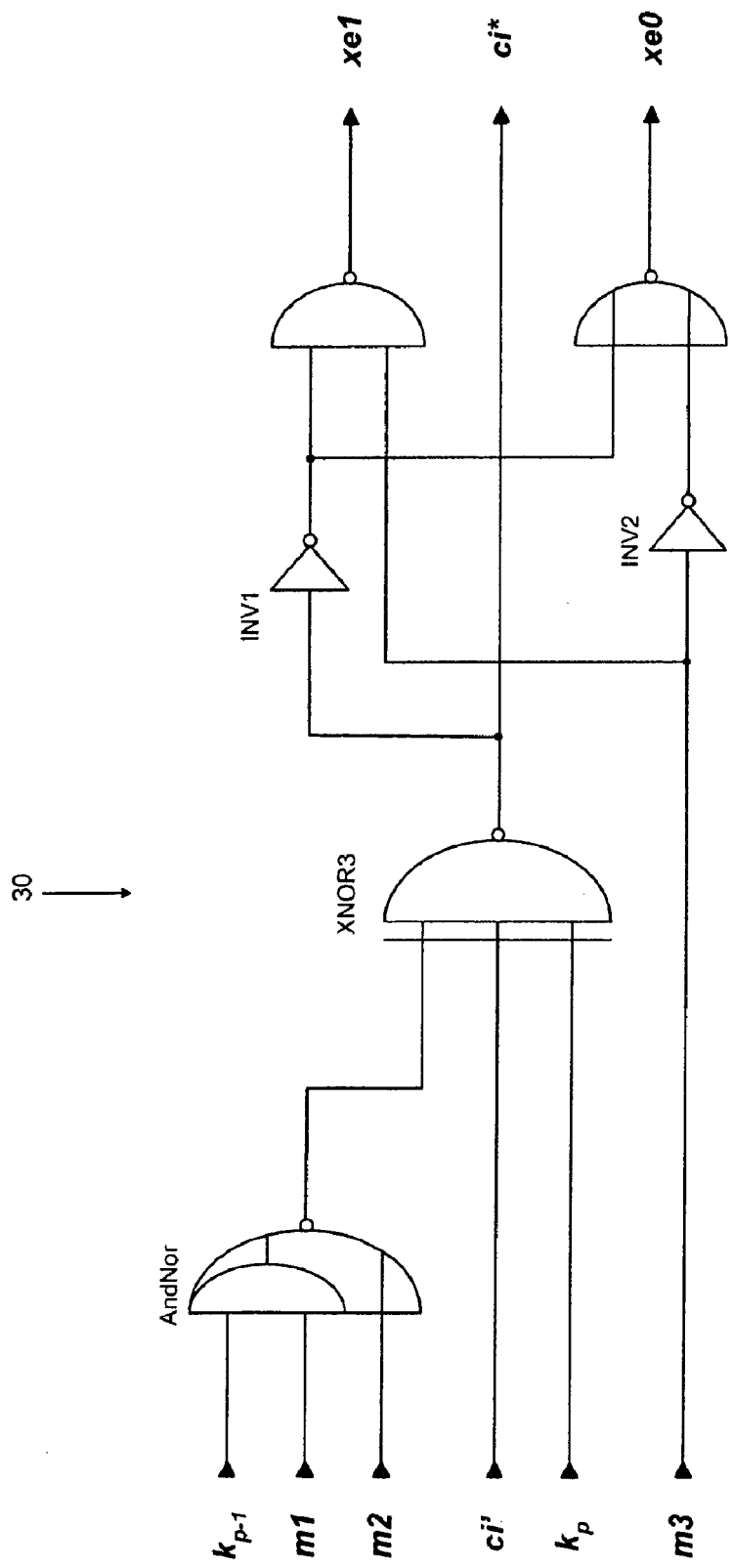
Figure 4:
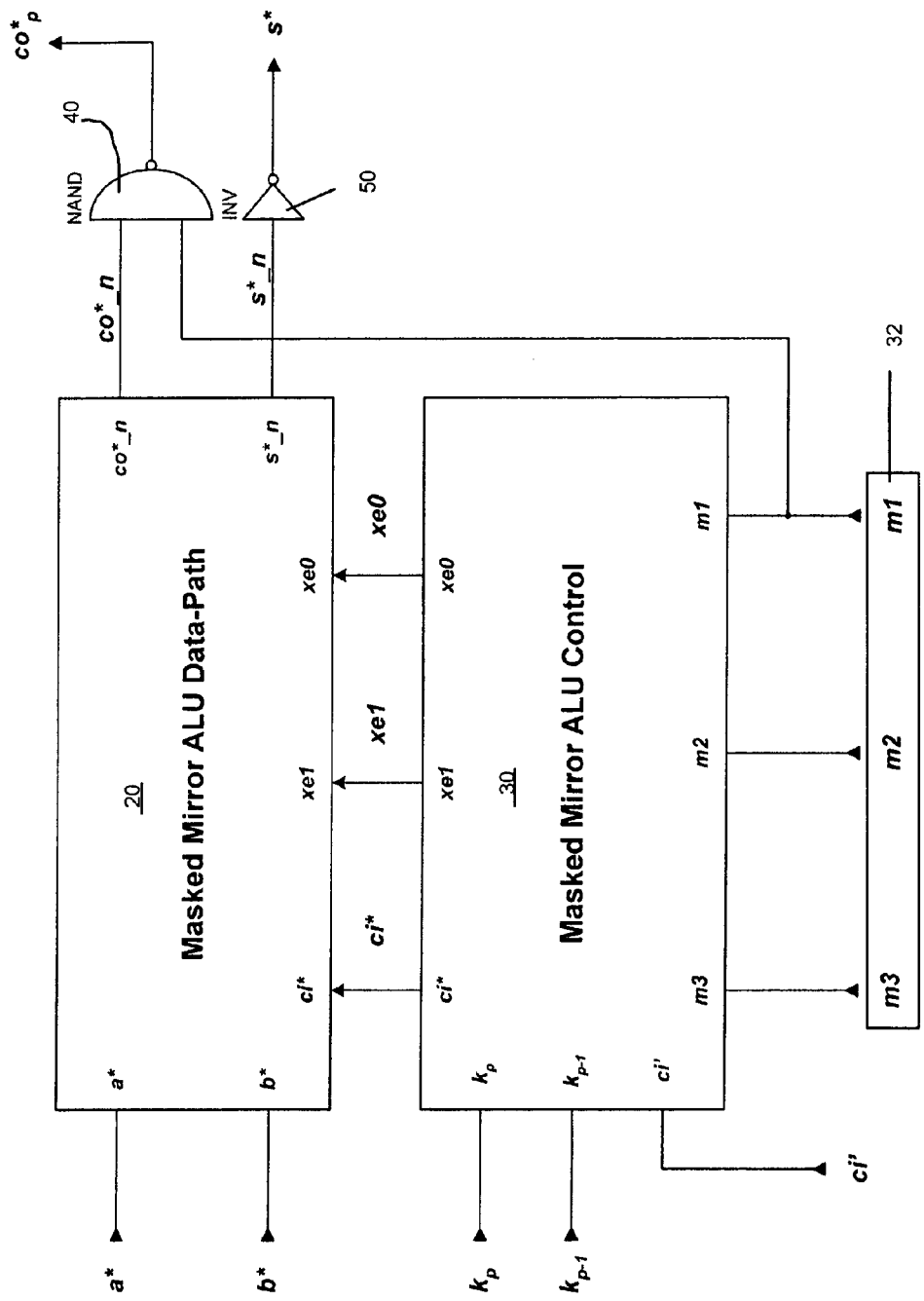
Figure 5:
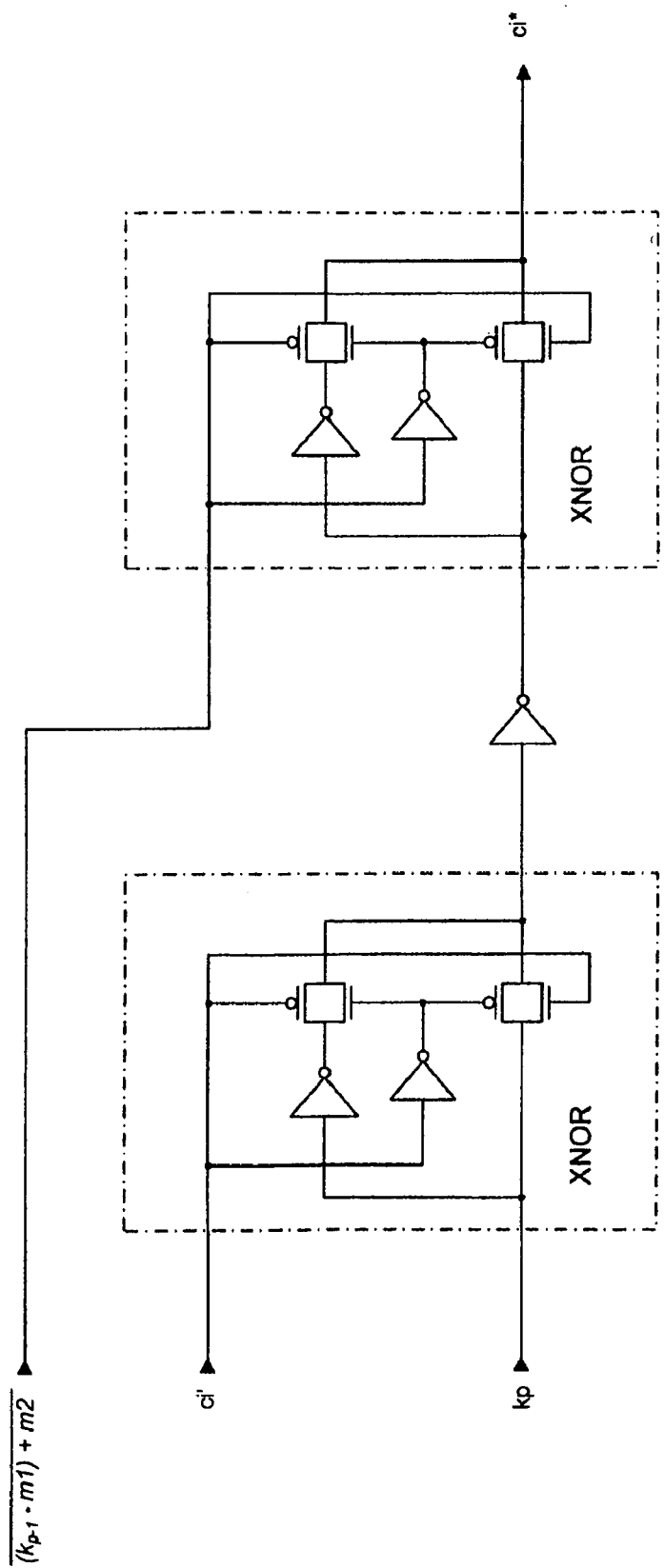

The present invention will be described with respect to a preferred embodiment, in which:

FIG. 2 shows a masked mirror adder according to the present invention;

FIG. 3 shows ALU control circuitry for the masked mirror adder of FIG. 2;

FIG. 4 shows the controlled cell and the interaction of the control circuitry of FIG. 3 with the adder of FIG. 2;

FIG. 5 shows a possible implementation for the XNOR3 gate of FIG. 3; and

FIG. 6 shows a table summarizing the logical operations of the ALU cell.

DETAILED DESCRIPTION

Attempts to implement OTP masks using conventional standard cells have led to unacceptable values for the computing speed and energy expenditure. Because of this, commercial implementation of OTP-masked computation has been difficult.

One embodiment of the present invention provides a cell for an arithmetic logic unit comprising:
  a first input;
  a second input;
  a carry bit input;
  a first control input and a second control input;
  a circuit connected to the first input, the second input, the carry bit input, the first control input, and the second control input, the circuit having a first output and a second output;
  the second output having a first value as a function of the first input and the second input when the first control input and the second control input are supplied values equal to a value at the carry bit input, and having a second value as a function of the first input and second input when the values at the first control input and the second control input are independent of the value at the carry-in input.

A further embodiment of the present invention provides control circuitry for an ALU cell comprising:
  a mask bit input;
  a carry bit input;
  and
  a circuit outputting a masked carry bit and having two control outputs.

A further embodiment of the present invention also provides control circuitry for an ALU cell comprising:
  a current mask bit input;
  a previous mask bit input inputting the mask bit from an immediately upstream ALU cell;
  a carry bit input;
  three control bit inputs;
  and
  a circuit outputting a masked carry bit and having two control outputs as a function of the current mask bit input and the previous mask bit input.

In a further embodiment, the present invention provides a masked ALU cell comprising:
  a carry bit input;
  a mask bit input;
  a control circuit receiving the carry bit input and the mask bit input and outputting a masked carry bit, the control circuit having at least three control states; and
  a base circuit logically combining a first input, a second input and the masked carry bit to: (a) logically add the carry bit input, the second input and the masked carry bit when the control circuit is in a first of the three control states, (b) logically XOR or XNOR the first input and second input when the control circuit is in a second state of the three control states; and (c) logically AND, OR, NOR or NAND the first input and second input when the control circuit is in a third state of the three control states.

The present invention also provides a method for logically combining two inputs in a masked ALU cell comprising:
  receiving a carry bit from an adjacent upstream ALU cell;
  masking the carry bit by performing an exclusive-or on the carry bit with a mask bit; and
  controlling an ALU cell to logically add two inputs and the masked carry bit in the ALU cell as well as perform bitwise AND, OR, NAND, NOR, XOR or XNOR on the two inputs.

The present invention provides a mirror adder, control circuitry and methods suited especially well for standard cell implementation. The ALU cell of the present invention not only provides the arithmetic function of (one-bit) addition of two binary numbers (the two operands), but also is programmable by suitable control signals so as to perform logical operations, namely bitwise NAND, NOR or XOR operations, on the two operands. When suitably inverting the operands or the result, it is then possible to implement any possible bitwise logical operations as well as arithmetic operations. Moreover, all these operations are intended to be performed such that all data (operands, carries (carry-ins/carry-outs), and results) are XOR-masked using time-variant OTP masks.

Compared to an OTP implementation using conventional standard cells, this means significantly (several hundred percent) higher computing speeds and significantly lower energy expenditure.

FIG. 2 shows a possible mirror adder implementation 20 in CMOS according to the present invention, with transistors TP1 to TP12 and TN1 to TN12. The transistors TN9 and TP12 are connected to an input control signal xe1; and transistors TN12 and TP9 are connected to input signal xe0.

Figure 1:
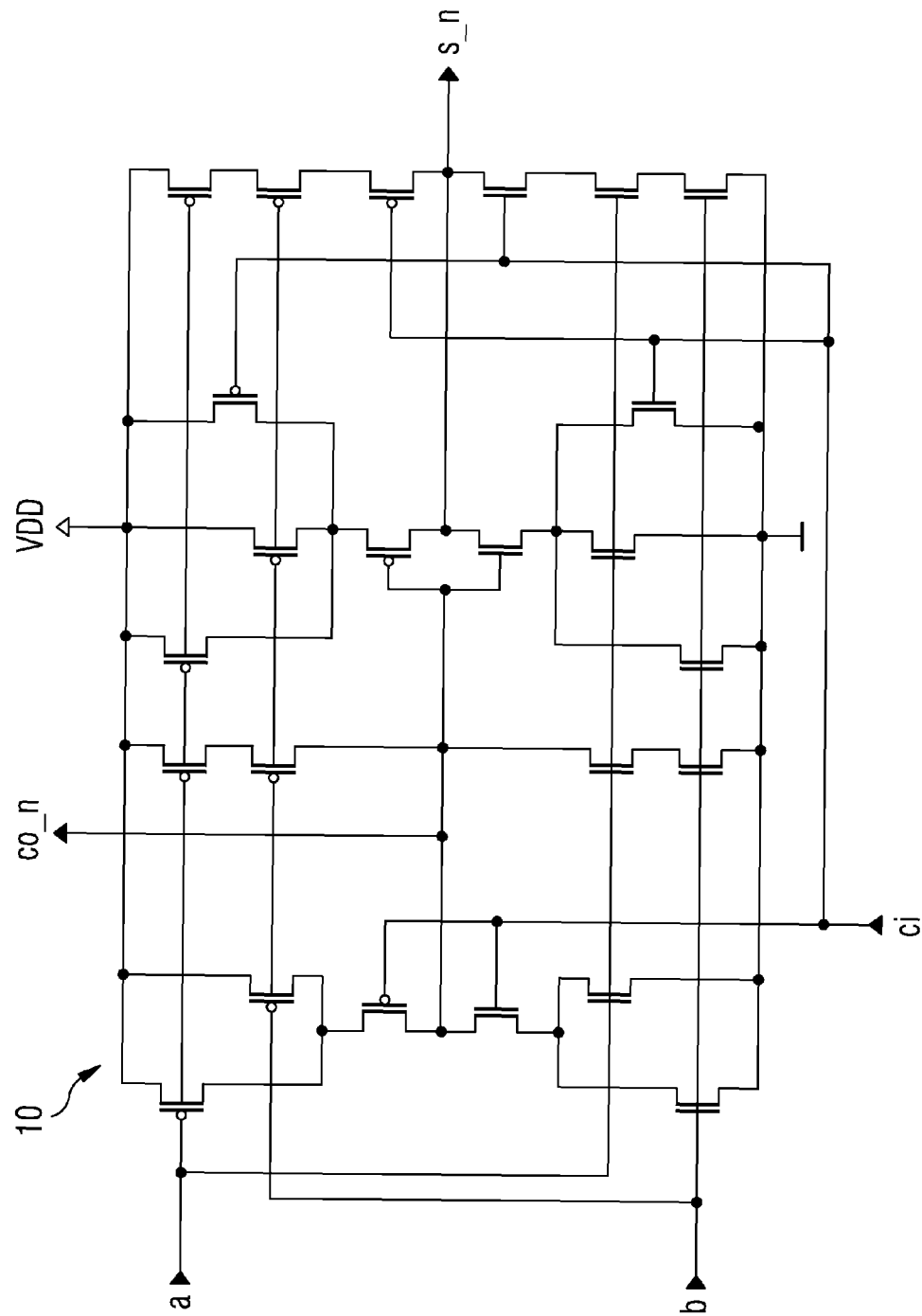
FIG. 1 shows a prior art mirror adder.

From this, it follows that the relationship between co*_n and a*, b* and ci* in FIG. 2 is the same as that between co_n and a, b, and ci in FIG. 1:

$$co^*\_n = \overline{a^* \cdot b^* + b^* \cdot ci^* + ci^* \cdot a^*} \quad (6)$$

and, secondly, that the equation for s*_n in FIG. 2 is:

$$s^*\_n = \overline{a^* \oplus b^* \oplus ci^*} \quad (7)$$

if it holds that xe1=xe0=ci*,
and, respectively, $$s^*\_n = \overline{co^*\_n} = a^* \cdot b^* + b^* \cdot ci^* + ci^* \cdot a^* \quad (8)$$

for xe1=1, xe0=0

Other values for xe1 and xe0 are not needed in this embodiment.

With the definition $$y^* = y \oplus k_p, \quad (9)$$

(where $k_p$ denotes the mask bit for bit position p) for masked data, it follows from the covariance of the full adder equations under the masking operation, first of all, that the circuit specified in FIG. 2 has the properties required for calculating (6) the masked carry-out co*_n from the masked inputs a*, b* and ci*.

As for the inverted sum bit s*_n, i.e., the equations (7) and (8), (7) represents the conventional (covariant) full adder equation for the inverted sum bit if ci* denotes the carry bit masked with $k_p$ of bit position p-1.

However, if it is provided that the carry-in bit ci* for bit position p is equal to mask bit $k_p$ or to its inverse $\overline{k_p}$, respectively, it follows that (7) implements the $k_p$-masked XOR and XNOR operations on a* and b*, respectively:

$$s^*\_n = \overline{a^* \oplus b^* \oplus k_p} \quad (10)$$

for ci*=$k_p$, and, respectively, $$s^*\_n = \overline{a^* \oplus b^* \oplus \overline{k_p}} = a^* \oplus b^* \oplus k_p$$

for ci*=$\overline{k_p}$.

Alternatively to equation (7), or to the ADD, XOR and XNOR operations, as described above, the operations NAND and NOR can be implemented by (8). To this end, in addition to the conditions xe1=1, xe0=0 for the validity of (8), it should again be provided that the carry-in bit ci* for bit position p is equal to mask bit $k_p$ or to its inverse $\overline{k_p}$, respectively. If so, it follows that (8) implements the $k_p$-masked NAND and NOR operations on a* and b*, respectively:

$$s^*\_n = a^* \cdot b^* + (a^* + b^*) \cdot ci^*$$
$$= (a \oplus k_p) \cdot (b \oplus k_p) + (a \oplus k_p + b \oplus k_p) \cdot k_p =$$
$$= a \cdot b \cdot \overline{k_p} + \overline{a \cdot b} \cdot k_p =$$
$$= (a \cdot b) \oplus k_p =$$
$$= (a \cdot b)^*$$

for ci*=$k_p$, and, respectively, $$s^*\_n = a^* \cdot b^* + (a^* + b^*) \cdot ci^*$$
$$= (a \oplus k_p) \cdot (b \oplus k_p) + (a \oplus k_p + b \oplus k_p) \cdot \overline{k_p} =$$
$$= (a + b) \cdot \overline{k_p} + \overline{a + b} \cdot k_p =$$
$$= (a + b) \oplus k_p =$$
$$= (a + b)^*$$

for ci*=$\overline{k_p}$.

FIG. 3 shows a control circuit 30 by which the value combinations for xe1, xe0 and ci* specified above for the implementation of the various operations can be generated as a function of the mask bits $k_p$ (of the bit position p associated with the currently considered ALU cell) and $k_{p-1}$ (of the bit position p-1 whose carry-out bit $co_{p-1}$ represents the carry-in bit of bit position p), the carry-in bit ci'=$\overline{m1 \cdot co_{p-1}^*\_n}$ (see FIG. 4) of bit position p and the control signals m3, m2 and m1.

The table of FIG. 6 summarizes the generation of xe1, xe0 and ci*:

In this regard, it should further be noted that the combinations of control signals m3, m2, m1 (0, 0, 1 and 0, 1, 1 and 1, 1, 1), which are not listed in the above table, are excluded by an external control logic, because otherwise the resulting expressions for the output data of the ALU cell of the present invention would be useless for arithmetic-logic purposes.

FIG. 4 shows the generation of co*$_p$=$\overline{m1 \cdot co_p^*\_n}$, as well as the interconnection of the subcircuits 20, 30 shown in FIGS. 2 and 3 of the masked mirror ALU cell of the present invention. m1 and the value co*_n are inputted to a NAND gate 40 to generate the carry bit for the next downstream cell, so that co*$_p$ becomes ci' for the next cell. s*_n can pass through an inverter 50 to form s*. The operations listed in the table shown in FIG. 6 reflect s*. The external control logic 32 can prevent concurrent values for m3, m2, m1 of (0, 0, 1) and (0, 1, 1) and (1, 1, 1), for this embodiment.

All circuit elements included FIG. 4 or its subfigures (which may have for example 63-66 transistors, depending on the implementation) can be integrated physically (in the layout) into one unit, in an extension of conventional standard cell libraries. This, together with the minimal number of transistors and the small number and small electrical capacitance of the switching nodes, is the reason for the high computing speed and the low energy expenditure of this cell.

FIG. 5 illustrates an advantageous implementation of the XNOR3 circuit symbolically shown in FIG. 3, using the so-called "transmission gate" design style.

What is claimed is:
1. A cell for an arithmetic logic unit comprising a mirror adder circuit modified to perform additional arithmetic or logic functions without additional transistors excluding input or output inverters, comprising:

a first masked input a*;
a second masked input b*;
a third masked input ci*, wherein the third masked input ci* is a masked carry input, a mask bit $k_p$, or an inverted mask bit $\overline{k_p}$;
a first control input xe0 and a second control input xe1; and
a first circuit comprising a first plurality of transistors, wherein inputs of the first plurality of transistors are connected to the first masked input a*, the second masked input b*, and the third masked input ci*, and the first plurality of transistors having a first output co*_n, the first output co*_n being a masked inverted carry-out bit;
a second circuit comprising a second plurality of transistors, wherein inputs of the second plurality of transistors are connected to the first masked input a*, the second masked input b*, the first output co*_n, the first control input xe0, and the second control input xe1, and the second plurality of transistors having a second output s*_n;
the second output s*_n having a first value, when the first control input xe0, the second control input xe1, and the third masked input ci* are equal to the masked carry input, the first value being an inverted masked sum bit s*_n of a masked addition of the first masked input a*, the second masked input b*, and the third masked input ci*;
the second output s*_n having a second value when the first control input xe0, the second control input xe1, and the third masked input ci* are equal to the mask bit $k_p$, the second value being an inverted masked XOR output of the first masked input a* and the second masked input b*,
the second output s*_n having a third value when the first control input xe0, the second control input xe1, and the third masked input ci* are equal to the inverted mask bit $\overline{k_p}$, the third value being an inverted masked XNOR output of the first masked input a* and the second masked input b*; and
the second output s*_n having a fourth value when the values at the first control input xe0 and the second control input xe1 are independent of the value at the third masked input ci*, the fourth value being an inverted masked NAND or NOR output of the first masked input a* and the second masked input b*.

2. The cell as recited in claim 1 wherein the second output s*_n having the fourth value when the first control input xe0 is a logical zero and the second control input xe1 a logical one.

3. The cell as recited in claim 1 further comprising:
a NAND gate having a carry bit output co*_p based on a control bit input m1 and the masked inverted carry-out bit co*_n.

4. A processor comprising a plurality of cells as recited in claim 1.

5. The cell as recited in claim 1, further comprising:
a second mask bit $k_{p-1}$;
a carry bit input ci';
three control bit inputs m1, m2, m3; and
a third circuit outputting the third masked input ci* to the first circuit and the first control input xe0, and the second control input xe1 to the second circuit.

6. The cell as recited in claim 1, further comprising:
an upstream mask bit input $k_{p-1}$ inputting the mask bit from an immediately upstream ALU cell;
a carry bit input ci'; and
a third circuit outputting the third masked input ci* to the first circuit and outputting the first control input xe0 and the second control input xe1 to the second circuit as a function of the mask bit $k_p$ and the upstream mask bit input $k_{p-1}$.

7. The cell as recited in claim 6 further comprising three control bit inputs m1, m2, m3.

8. The cell as recited in claim 1, further comprising:
a carry bit input ci';
a second mask but input $k_{p-1}$;
a control circuit receiving the carry bit input ci' and the mask bit $k_p$, the second mask bit input $k_{p-1}$, and outputting the third masked input ci*, the control circuit having at least three control states; and
the second circuit logically combining the first masked input a*, the second masked input b* and the third masked input ci* to: (a) arithmetically masked add the first masked input a*, the second masked input b* and the third masked input ci* when the control circuit is in a first of the three control states, (b) masked XOR or XNOR the first masked input a* and second masked input b* when the control circuit is in a second state of the three control states; and (c) masked NOR or NAND the first masked input a* and second masked input b* when the control circuit is in a third state of the three control states.

9. A method for logically combining two masked inputs a* and b* in a masked ALU cell comprising a mirror adder circuit modified to perform additional arithmetic or logic functions without additional transistors excluding input or output inverters comprising:
providing a first circuit;
providing a second circuit to mask a carry bit ci' received from an adjacent upstream ALU cell by performing an exclusive-or operation on the carry bit ci' with a first mask bit $k_p$ and a second mask bit $k_{p-1}$, the second circuit outputting a masked input ci*, wherein the masked input ci* is a masked carry input, the first mask bit $k_p$, or an inverted mask bit $\overline{k_p}$;
controlling the first circuit by the second circuit through two control signals xe0 and xe1 and the masked input ci*, in order for the first circuit to arithmetically masked add two masked inputs a*, b*, and the masked input ci* when the two control signals xe0 and xe1 and the masked input ci* are equal to the masked carry input;
perform bitwise inverted masked XOR operation on the two masked inputs a*, b* when the two control signals xe0 and xe1 and the masked input ci* are equal to the mask bit $k_p$; and
perform bitwise inverted masked XNOR operation on the two masked inputs a*, b* when the two control signals xe0 and xe1 and the masked input ci* are equal to the inverted mask bit $\overline{k_p}$; and
perform bitwise inverted masked NAND or NOR operation on the two masked inputs a*, b* when the two control signals xe0 and xe1 are independent of the masked input ci*.

10. A processing unit comprising a mirror adder circuit modified to perform additional arithmetic or logic functions without additional transistors excluding input or output inverters comprising:
a control unit adapted to generate a remasked input ci*, a first control input xe0, and a second control input xe1 wherein the remasked input ci* is a masked carry input, a mask bit $k_p$, or an inverted mask bit $\overline{k_p}$; and a data unit adapted to generate a masked inverted carry output co*_n based on the remasked input ci* using a first set of transistors, and a masked inverted sum bit s*_n based on the first control input xe0, and the second control input xe1 using a second set of transistors, wherein the masked inverted sum bit s*_n is generated from a masked addition of two masked inputs a*, b* and the remasked input ci* when the first control input xe0, the second control input xe1 and the remasked input ci* are equal to the masked carry input; and wherein the masked inverted sum bit s*_n is generated from a bitwise inverted masked XOR of the two masked inputs a*, b* when the first control input xe0, the second control input xe1 and the remasked input ci* are equal to the mask bit $k_p$; and wherein the masked inverted sum bit s*_n is generated from a bitwise inverted masked XNOR of the two masked inputs a*, b* when the first control input xe0, the second control input xe1 and the remasked input ci* are equal to the inverted mask bit $\overline{k_p}$; and wherein the masked inverted sum bit s*_n is generated from a bitwise inverted masked NAND or NOR of the two masked inputs a*, b* when the first control input xe0 and the second control input xe1 are independent of the remasked input ci*.

11. The processing unit of claim 10, wherein the control unit is adapted to generate the remasked input ci* from a first function of a masked carry bit input ci', the mask bit $k_p$, and a second function.

12. The processing unit of claim 11, wherein the second function is a function of first control bit input m1, a second control bit input m2, and a second mask input $k_{p-1}$.

13. The processing unit of claim 12, wherein the control unit is adapted to generate the first control input xe0 and the second control input xe1 from the first function and a third control bit input m3.

14. The processing unit of claim 10, wherein the data unit is adapted to generate the masked inverted carry output co*_n from the two masked input a*, b*, and the remasked input ci*.

15. The processing unit of claim 14, wherein the two masked input a*, b*, the remasked bit input ci*, the masked carry output co*_n, and the masked inverted sum bit s*_n share the masked bit $k_p$.

* * * * *